(12) United States Patent
Schmidt et al.

(10) Patent No.: US 10,991,965 B2
(45) Date of Patent: Apr. 27, 2021

(54) MEMBRANE ELECTRODE ASSEMBLY FOR A FUEL CELL, AND FUEL CELL

(71) Applicants: VOLKSWAGEN AG, Wolfsburg (DE); AUDI AG, Ingolstadt (DE)

(72) Inventors: Lasse Schmidt, Wolfsburg (DE); Martin Göbel, Heilbronn (DE); Miriam Stiefel, Meinersen (DE); Julian Ronnenberg, Vordorf (DE)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 96 days.

(21) Appl. No.: 15/751,373

(22) PCT Filed: Aug. 10, 2016

(86) PCT No.: PCT/EP2016/069026
§ 371 (c)(1),
(2) Date: Feb. 8, 2018

(87) PCT Pub. No.: WO2017/025557
PCT Pub. Date: Feb. 16, 2017

(65) Prior Publication Data
US 2018/0233758 A1      Aug. 16, 2018

(30) Foreign Application Priority Data

Aug. 12, 2015   (DE) .................. 10 2015 215 381.9

(51) Int. Cl.
*H01M 8/1004*   (2016.01)
*H01M 4/88*     (2006.01)
*H01M 8/0234*   (2016.01)
*H01M 8/241*    (2016.01)
*H01M 8/1018*   (2016.01)
*H01M 4/86*     (2006.01)

(52) U.S. Cl.
CPC ....... *H01M 8/1004* (2013.01); *H01M 4/8807* (2013.01); *H01M 8/0234* (2013.01); *H01M 8/241* (2013.01); *H01M 4/8605* (2013.01); *H01M 4/8636* (2013.01); *H01M 2008/1095* (2013.01)

(58) Field of Classification Search
None
See application file for complete search history.

(56) References Cited

U.S. PATENT DOCUMENTS

2004/0214072 A1    10/2004  Miura et al.
2006/0105159 A1*    5/2006  O'Hara ............... H01M 8/0234
                                                  428/318.6
2009/0029234 A1*    1/2009  Okumura ............. H01M 4/881
                                                  429/404

FOREIGN PATENT DOCUMENTS

DE    197 21 952 A1    12/1998
DE    100 52 223 A1     5/2002
(Continued)

*Primary Examiner* — Zhongqing Wei
(74) *Attorney, Agent, or Firm* — Seed Intellectual Property Law Group LLP

(57) ABSTRACT

The invention relates to a membrane electrode assembly (15) for a fuel cell (10), comprising a membrane (11) on each side of which is disposed a catalytic layer (12, 13), and on this a gas diffusion layer (30).
It is provided that the gas diffusion layer (30) comprises a layer with electrically conductive particles (35), and a portion of the particles (35) is arranged directly adjacent to the catalytic layer (12, 13).

17 Claims, 2 Drawing Sheets

(56) References Cited

FOREIGN PATENT DOCUMENTS

Figure 1:
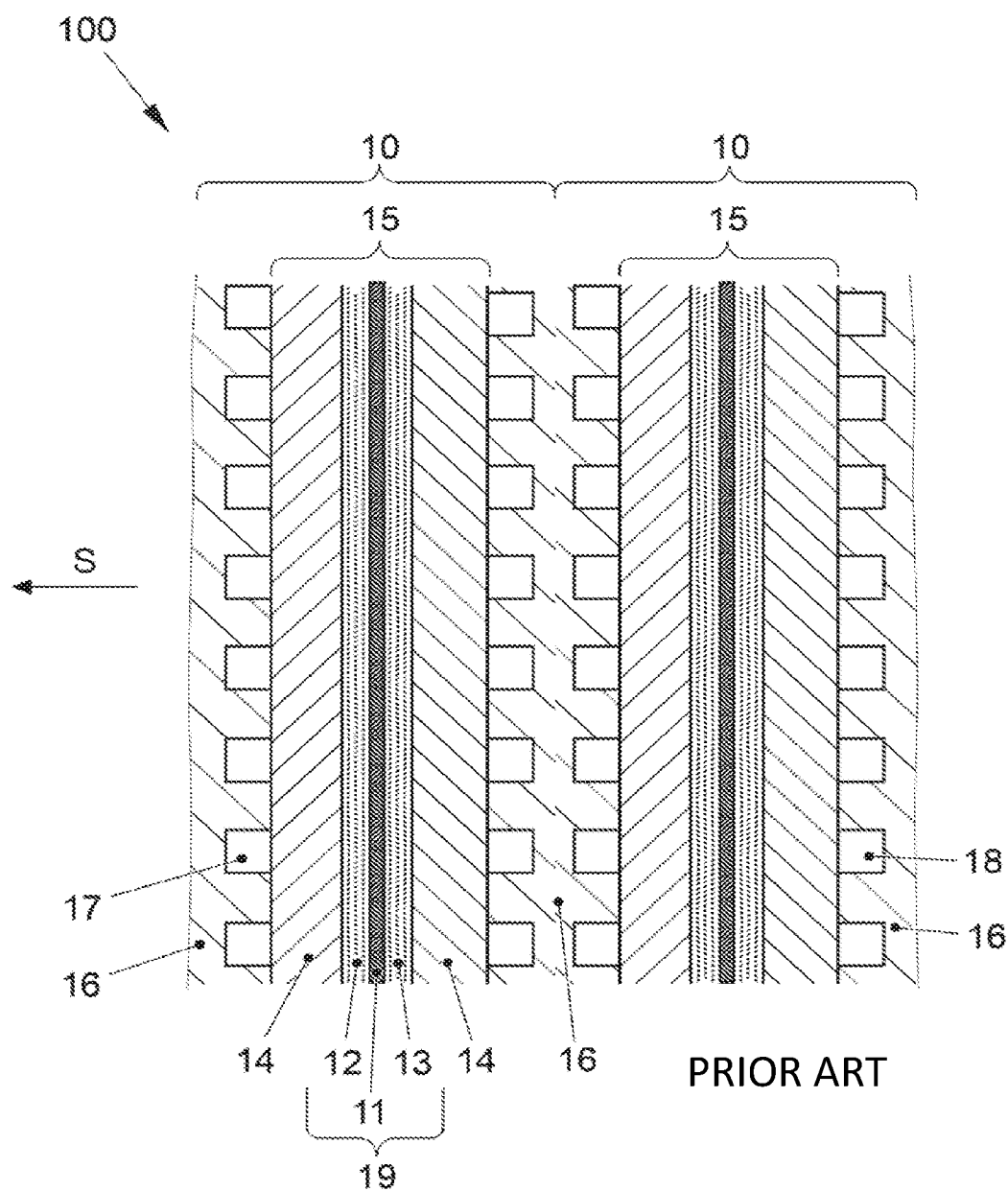

EP  2 337 128 A1  6/2011
EP  2 722 916 A1  4/2014

* cited by examiner

MEMBRANE ELECTRODE ASSEMBLY FOR A FUEL CELL, AND FUEL CELL

The invention relates to a membrane electrode assembly for a fuel cell comprising a membrane on which a catalytic layer and a gas diffusion layer are arranged on both sides, and also a fuel cell with such a membrane electrode assembly.

Fuel cells use the chemical conversion of a fuel with oxygen in order to generate electrical energy. For this purpose, fuel cells contain membrane electrode assemblies as core components, which in each case can be designed as a composite of an ion-conducting, in particular proton-conducting, membrane and a respective electrode (anode and cathode) arranged on each side of the membrane. In addition, gas diffusion layers can be arranged on both sides of the membrane electrode unit on the sides of the electrodes facing away from the membrane. As a rule, the fuel cell has a multiplicity of membrane electrode assemblies arranged in the stack, whose electrical outputs add together. During operation of the fuel cell, the fuel, in particular hydrogen $H_2$ or a gas mixture containing hydrogen, is supplied to the anode, where an electrochemical oxidation of $H_2$ to $H^+$ with loss of electrons takes place. A hydrous or anhydrous transportation of the protons ($H^+$) from the anode compartment into the cathode compartment takes place via an electrolyte or the membrane, which provides gastight separation of the reaction spaces from each other and electrically insulates them. The electrons provided at the anode are guided to the cathode via an electrical line. The cathode is supplied with oxygen ($O_2$) or a gas mixture containing oxygen, so that a reduction of $O_2$ to $O^{2-}$ takes place with electrons being taken up. At the same time, those oxygen anions react in the cathode chamber with the protons transported via the membrane while forming water. As a result of the direct conversion of chemical into electrical energy, fuel cells have improved efficiency compared to other electricity generators because the Carnot factor is avoided.

The fuel cell is formed by a plurality of individual cells arranged in the stack, which is why it is also called a fuel cell stack. Arranged between the membrane electrode assemblies are bipolar plates which ensure a supply of the individual cells with the operating media, thus the reactants, and with a temperature control medium. In addition, the bipolar plates can provide an electrically conductive contact to the membrane electrode assemblies.

On each side of the membrane, a gas diffusion layer is arranged. On the one hand, this has the task of supplying hydrogen and oxygen uniformly to the foil, and on the other hand, it conducts electricity, water and heat to the bipolar plates. For this purpose, the gas diffusion layer comprises a material which has good electrical conductivity, good gas permeability and sufficient mechanical stability.

To improve the gas diffusion layers, efforts are being made to increase their gas permeability and thus to increase the diffusion of the operating media and the discharge of water.

For example, DE 100 52 223 A1 describes a gas diffusion electrode which has carbon fibers which are arranged in a defined manner by means of a particular production method.

Furthermore, from DE 197 21 952, a gas diffusion layer is further known which comprises dust-like particles which are cast in a thermoplastic binder before being arranged as a layer on the membrane.

What the known gas diffusion layers have in common is that they have an essentially flat surface. But since the membrane surface, in particular the surface of a catalytic coating on the membrane, has unevennesses, gas diffusion layers according to prior art are present only in some places. The interface between the membrane and the gas diffusion layer therefore has an insufficiently high contact resistance, which impedes the transportation of an electrically generated charge.

It is therefore an object of the invention to provide a membrane electrode assembly having a reduced contact resistance.

This object is achieved by a membrane electrode assembly having the features of the independent claim. A first aspect of the invention thus relates to a membrane electrode assembly for a fuel cell comprising a membrane, on each side of which is disposed a catalytic layer and a gas diffusion layer adjacent thereto. According to the invention, it is provided that the gas diffusion layer comprises a layer with electrically conductive particles, or consists of such a layer, wherein at least a portion of the particles is directly adjacent to the catalytic layer.

The gas diffusion layer according to the invention in particular has the advantage that a particularly low contact resistance is present within the layer with electrically conductive particles, since the particles are automatically packed extremely densely together and no relatively large voids arise at which electrical conductivity within the layer would be reduced. In addition, the particles at the interfaces of the layer adapt very well to the unevennesses of the neighboring layers. On the macroscopic level, an optimal adaptation results.

The contact resistance at the interface between the membrane and gas diffusion layer is reduced in the membrane electrode assembly according to the invention, in particular by the direct contact of gas diffusion layer and catalytic coating. The particles of the gas diffusion layer are distributed over a wide area on the membrane surface. Depending on the particle size, the contact area between the material of the gas diffusion layer and the membrane surface is maximized and the contact resistance is reduced. A more favorable contact resistance would be achieved under similar conditions only by applying the material in a liquid state.

The gas diffusion layer according to the invention is preferably produced by the material of the gas diffusion layer being applied to the membrane directly in particulate form. Voids within the layer and at the interface are filled by the agitation process in such a way that they have a defined shape and size suitable for the removal of water. Furthermore, the packing of the particles can be further optimized by vibration, such as shaking, and voids can thus be reduced further. The particles are then fixed in place. This fixing is effected, for example, by compressing the cell, by adding chemical binders, and/or by using thermal fixing methods.

The membrane electrode assembly has at least one gas diffusion layer, one membrane, and electrodes arranged on each side of the membrane. The electrodes comprise an electrically conductive catalytic material disposed between the gas diffusion layer and the membrane. The catalytic material can either be associated with the membrane via catalytic coating of the membrane, take the form of a self-supporting layer, or even, in the case of a gas diffusion electrode, be formed by coating the surface of the gas diffusion layer adjoining the membrane. In the present case it is preferred that the membrane is a catalytic coated membrane, so that the electrode is to be associated with the membrane.

The electrically conductive particles preferably have an average particle size in the range from 10 nm to 1000 μm.

Furthermore, it is preferred that the particles have different particle sizes. In this case, a broad spectrum of particle size distribution is particularly preferred. This results in a broad distribution of particle sizes with a large variance, which is preferably in the range of 10 nm to 1000 microns. The advantage of this embodiment is, for example, that voids between larger particles can be filled by smaller particles such that a larger electrically conductive contact surface is created between individual particles and the contact resistance is thus reduced, and at the same time the voids are specifically designed to support water transportation through the gas diffusion layer.

Particularly advantageously, the particles comprise at least two batches, each of which has an average particle size, wherein the at least two average particle sizes differ from each other by at least one error range. Here, the particle size distribution within the batches is relatively small and the batches are preferably clearly separable from each other. The batches are either intermixed or, as is preferred, arranged in separate layers.

In the present case, batch is understood as meaning in each case a quantity of particles which are similar in shape and size. The number of particles that can be associated with a batch can vary between batches. Advantageously, the volume of the individual batches is comparable, in particular of the same order of magnitude, preferably is the same.

It is particularly preferred for the particles to be arranged in the form of a gradient of particle sizes which runs perpendicular to the membrane surface. In particular, the advantage of this embodiment is that, with increasing particle size, the number and size of the pores and channels between the individual particles increases, and thus a porosity of the gas diffusion layer can be adjusted incrementally via the thickness of the gas diffusion layer.

In an alternative embodiment, the mean particle size changes incrementally in the direction of the membrane, that is, the gas diffusion layer has at least two particulate layers having different average particle sizes. The advantage of this embodiment is that it can be simply produced by the sequential discharge of particles of different particle sizes.

Furthermore, in these embodiments the contact resistance is minimized at the interface where the smallest particles are disposed, thereby permitting an optimal transition of the electric charge at the interface between two layers. As the distance from this interface increases, the increasing particle size results in a reduction in the number of interfaces that must be overcome by an electrical charge, and interface losses are thus also reduced. In this way, within the gas diffusion layer according to the invention an optimal equilibrium can be adjusted locally between as few interface losses as possible and the lowest possible contact resistance.

It is further preferred for the average particle size to decrease in the direction of the catalytic layer, that is to say, for the particles with the smallest particle sizes to be disposed on the catalytic layer. The fuel cell reaction and thus the generation of electrical energy take place at the catalytic layer. The generated electrical charge is conducted across the gas diffusion layer to the adjacent bipolar plates. This embodiment makes it possible for the first interface crossing which a generated electrical charge must pass, namely the transition between the membrane and the gas diffusion layer, to have the lowest possible contact resistance, thus increasing the efficiency of the membrane electrode assembly and in particular the efficiency of the subsequent fuel cell.

Particularly advantageously, the gas diffusion layer has a gradient of the size of the voids or pores formed between the particles. In particular, this gradient runs ascending from the catalytic layer across the thickness of the gas diffusion layer. As a result, fluid-carrying paths are formed through the gas diffusion layer which promote water transportation through the gas diffusion layer and prevent water accumulating on the membrane surface.

The particles are preferably porous, electrically conductive particles. The particles preferably comprise graphite powder or carbon black, metals, and/or conductive polymers.

In a further preferred embodiment of the invention, it is provided that the gas diffusion layer has a cover layer on the side facing away from the membrane. This advantageously results in a closure or a sealing of the layer, and also to a fixation of the material. The cover layer is, for example, pressed or sintered material or alternatively fibrous materials, such as nonwovens or felts. The material of the cover layer preferably corresponds at least partially to the material of the particles.

Another aspect of the invention is a fuel cell having a membrane electrode assembly according to the invention. Due to the advantages of the membrane electrode assembly according to the invention, in particular due to the reduced contact resistance between the membrane electrode assembly and the gas diffusion layer, the fuel cell according to the invention has a greater efficiency in comparison with fuel cells of prior art.

Additional preferred embodiments of the invention arise from the remaining features stated in the dependent claims.

The various embodiments of the invention mentioned in this application may be combined advantageously with one another unless stated otherwise in individual cases.

Figure 2:
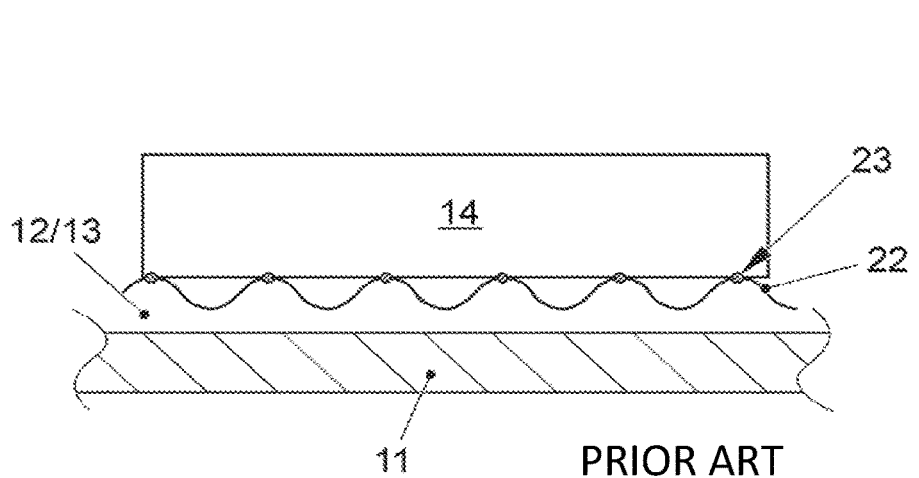
Figure 3:
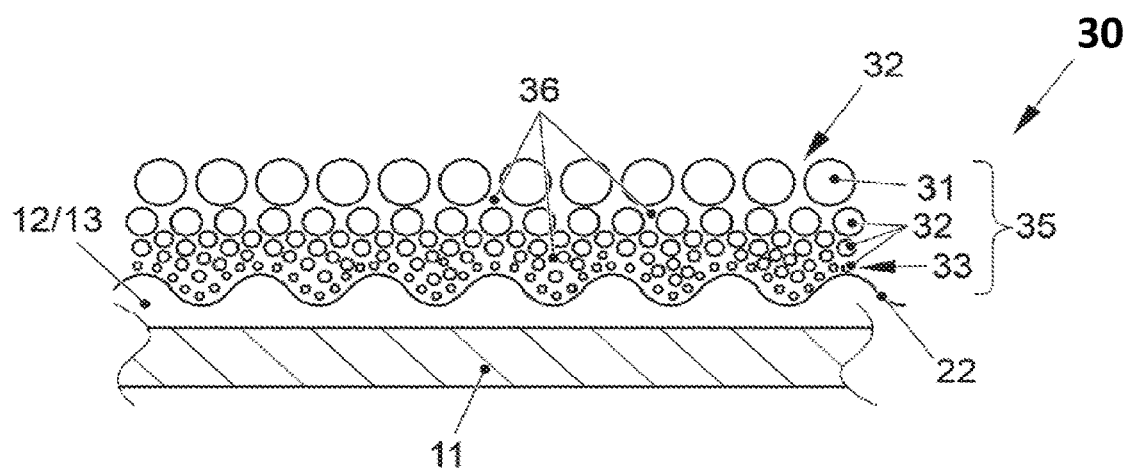

The invention is explained below in exemplary embodiments with reference to the accompanying drawings. The following is shown:

FIG. 1 a section of a fuel cell stack,

FIG. 2 a schematic structure of a membrane electrode assembly according to prior art; and FIG. 3 a schematic structure of a membrane electrode assembly according to a preferred embodiment of the invention.

FIG. 1 shows a cutout of a fuel cell stack, designated overall with 100, of which only two individual fuel cells 10 are shown here.

Each fuel cell 10 has a polymer electrolyte membrane 11 which consists of an electrolytically conductive polymer material, which in particular is capable of conducting protons. Typically, the polymer material requires a certain humidity to maintain its electrolytic conductivity. A catalyst layer respectively abuts both flat sides of the membrane 11, namely an anodic catalyst layer 12 and a cathodic catalyst layer 13. The catalyst layers 12 and 13 comprise a catalytic material, which is typically a precious metal, particularly platinum. Typically, the catalyst layers 12, 13 further comprise a porous, electrically conductive carrier material, on which the catalytic material is finely dispersed, for example a carbon-based material. The catalyst layers 12, 13 may further comprise components, for example polymer binder materials and the like.

A gas diffusion layer (GDL) 14 respectively adjoins each catalyst layer 12, 13. The GDL comprises a material through which liquids can flow which is likewise electrically conductive. For example, the GDL 14 comprises a carbon-based foam or paper material. The structure made up of membrane 11, the catalyst layers 12, 13, as well as the gas diffusion layers 14 is also characterized as the membrane electrode assembly 15, wherein the association of the gas diffusion layers 14 with the membrane electrode assembly 15 is not uniform in the literature.

A bipolar plate 16, also characterized as the flow field plate or flux field plate, is arranged between each of two membrane electrode assemblies 15. On its anode side, the bipolar plate 16 has anode flow channels 17 by means of which an anode operating media (fuel), particularly hydrogen, is routed to the anode catalyst layer 12. Furthermore, on its cathode side the bipolar plate 16 has cathode flow channels 18 by means of which a cathode operating gas, which is typically an oxygen-containing gas, usually air, is routed to the cathode catalyst layer 13. Typically, the bipolar plate 16 further has internal coolant channels, not shown here, through which a coolant can be routed for cooling the fuel cell stack 100. The bipolar plate 16 is produced from an electrically conductive material, for example a metal, a metal alloy, graphite, or an electrically conductive polymer material or polymer composite material. The bipolar plate 16 thus combines the functions of the operating media supply, the cooling, as well as the electrical connection of the catalytic electrodes 12, 13 to an external current circuit.

Normally a plurality of such individual cells 10 whose electrical outputs combine is arranged in a fuel cell stack 100. For electric vehicle applications, fuel cell stacks 100 typically comprise several hundred individual cells 10.

The catalyst layers 12 and 13 may on one hand be present as a coating on the membrane 11. In this case, this is also considered to be a catalytic coated membrane or CCM, which is designated overall with 19 in FIG. 1. Alternatively, the catalyst layers 12 and 13 may be present as a coating of the gas diffusion layers 14, so that they are then referred to as gas diffusion electrodes. It is also conceivable, however, for the catalyst layers 12 and 13 to take the form of independent, self-supporting layers. In the context of the present invention, a catalytic coated membrane 19 is preferred.

FIG. 2 shows a schematic representation of a cross-section of a membrane electrode assembly 15 according to prior art. The membrane electrode assembly 15' includes a polymer electrolyte membrane 11. Adjoining this is an electrode 12, 13. In the present illustration, the electrode is present on the membrane 11 as a catalyst layer 12, 13 disposed on the membrane 11, so that in the present case it is a catalytic coated membrane (CCM). The catalyst layer 12, 13 has an uneven surface 22 on the side facing away from the membrane 11. The gas diffusion layer 14 directly adjoins this surface, so that the catalytic coated membrane 11 and the gas diffusion layer 14 are in contact with each other. According to prior art, the gas diffusion layer 14 is formed as a substantially planar layer of an electrically conductive material. For this reason, contact between gas diffusion layer 14 and membrane 11 consists of a limited number of contact points 23.

FIG. 3 shows the cross-section of the structure of a membrane electrode assembly 15 according to a preferred embodiment of the invention. It comprises a membrane 11 with a catalytic coating 12, 13. A gas diffusion layer 30 according to the invention adjoins the catalytic coating. This comprises a layer of an electrically conductive powdery material, for example graphite powder or carbon black. In the shown embodiment, the gas diffusion layer 30 consists of this layer. In other embodiments, not shown, the gas diffusion layer 30 may also comprise further components, for example a cover layer, in particular in the form of an electrically conductive fabric or foam.

The gas diffusion layer 30 shown is composed of particles 35 of different sizes. Here the particle sizes cover as wide a range as possible. The particles 35 preferably have particle sizes in the range from 10 nm to 1000 µm. The particles, at least in the lower range, are thus smaller than the irregularities of the membrane surface. The number of contact points between membrane 11 and gas diffusion layer 30 is thus increased many times over in comparison with FIG. 2.

In the embodiment shown, however, the particles are not uniformly distributed; instead, the gas diffusion layer 30 is composed of a plurality of batches of electrically conductive particles 35. The batches are preferably made of the same material, but differ in their average particle size. In the present case, three batches can be distinguished, one with large particles 31, one with medium-sized particles 32 and one with the smallest particles 33. These may either be intermixed or, as shown, arranged in layers.

Regardless of whether the particles 35 are present in batches or evenly distributed in relation to their particle diameter, it is advantageous if they are arranged in the gas diffusion layer 30 in such a way that a gradient of the particle size is formed. In this case, it is particularly preferred for the smallest particles 33 to be disposed on the surface of the catalytic coated membrane 11, more precisely at the interface with the catalytic coating 12, 13, and for the largest particles 31 to form a final surface on the side of the gas diffusion layer facing away from the membrane.

The distribution of the particles 35 of different sizes affects the formation of voids 36, channels and pores between the particles. If the different particles 35 are arranged in layers of identical particle size, the diameter of the voids 36 increases with increasing particle size. With a gradual arrangement of the particles 35, a pore gradient is thus created in the gas diffusion layer 30. The voids 36 may also be influenced by the use of suitable materials and/or additives evaporating later, thus enabling the porosity of the gas diffusion layer 30 to be selectively adjusted.

In order to fix the particles 35, the gas diffusion layer 30 further includes thermoplastic binders and/or is compressed in the stack.

The gas diffusion layer 30 according to the invention results in the membrane electrode assembly 15 having greater efficiency. This is achieved by increasing the contact area between the catalytic coating 12, 13 of the membrane 11 and the gas diffusion layer 30, as this leads to a reduction in the contact resistance. In addition, the formation of a pore gradient improves the discharge of product water and thus the water management, which also has a positive effect on the efficiency and service life of the subsequent fuel cell.

LIST OF REFERENCE SYMBOLS

100 Fuel cell stack
10 Fuel cell (individual cell)
11 Polymer electrolyte membrane
12 Catalytic layer/anodic catalyst layer/anode
13 Catalytic layer/cathodic catalyst layer/cathode
14 Gas diffusion layer
15 Membrane electrode assembly
15 Membrane electrode assembly according to prior art
16 Bipolar plate
17 Anode flow channels
18 Cathode flow channels
19 Catalytic coated membrane
22 Surface of the catalytic layer
23 Contact points between membrane and gas diffusion layer 30 Gas diffusion layer according to the invention
31 Large particles
32 Medium-sized particles
33 Smallest particles
35 Particles of the gas diffusion layer
36 Voids
S Stack direction

The invention claimed is:

1. A membrane electrode assembly for a fuel cell, comprising:
   a membrane;
   a first catalytic layer positioned on a first surface of the membrane and a second catalytic layer positioned on a second surface of the membrane opposite to the first surface of the membrane; and
   a first gas diffusion layer positioned on the first catalytic layer and a second gas diffusion layer positioned on the second catalytic layer,
   wherein each of the first and second gas diffusion layers include electrically conductive particles, a portion of the particles of each of the first and second gas diffusion layers positioned immediately adjacent to the respective catalytic layer, and
   wherein the particles have different particle sizes that differ from one another by between 100 and 500 µm.

2. The membrane electrode assembly according to claim 1, wherein the electrically conductive particles have an average particle size in the range of 10 to 1000 µm.

3. The membrane electrode assembly according to claim 1, wherein the particles comprise at least two batches of particles, each batch of particles has a respective average particle size, and the at least two average particle sizes differ from one another.

4. The membrane electrode assembly according to claim 1, wherein the particles are arranged to have a gradient of the particle sizes which runs perpendicular to the first and second surfaces of the membrane.

5. The membrane electrode assembly according to claim 1, wherein the average particle size changes incrementally in a direction towards the membrane.

6. The membrane electrode assembly according to claim 1, wherein the average particle size of the particles decreases in the direction towards the membrane.

7. The membrane electrode assembly according to claim 1, wherein the particles include a graphite powder.

8. The membrane electrode assembly according to claim 1, wherein the first gas diffusion layer has a cover layer on a surface facing away from the membrane.

9. A fuel cell comprising a membrane electrode assembly including:
   a membrane;
   a first catalytic layer positioned on a first surface of the membrane and a second catalytic layer positioned on a second surface of the membrane opposite to the first surface of the membrane; and
   a first gas diffusion layer positioned on the first catalytic layer and a second gas diffusion layer positioned on the second catalytic layer,
   wherein each of the first and second gas diffusion layers include electrically conductive particles, a portion of the particles of each of the first and second gas diffusion layers positioned immediately adjacent to the respective catalytic layer, and
   wherein the particles have different particle sizes that differ from one another by between 100 and 500 µm.

10. The fuel cell according to claim 9, wherein the particles comprise at least two batches of particles, each batch of particles has a respective average particle size, and the at least two average particle sizes differ from one another.

11. The fuel cell according to claim 9, wherein the average particle size changes incrementally in a direction towards the membrane.

12. The fuel cell according to claim 9, wherein the average particle size of the particles decreases in the direction towards the membrane.

13. The fuel cell according to claim 9, wherein the particles include a graphite powder.

14. The fuel cell according to claim 9, wherein the first gas diffusion layer has a cover layer on a surface facing away from the membrane.

15. A method of fabricating a membrane electrode assembly for a fuel cell, comprising:
    positioning a first catalytic layer on a first surface of a membrane and a second catalytic layer on a second surface of the membrane opposite to the first surface of the membrane; and
    positioning a first gas diffusion layer on the first catalytic layer and a second gas diffusion layer on the second catalytic layer,
    wherein each of the first and second gas diffusion layers include electrically conductive particles, a portion of the particles of each of the first and second gas diffusion layers positioned immediately adjacent to the respective catalytic layer, and
    wherein the particles have particle sizes that differ from one another by between 100 and 500 µm.

16. The method according to claim 15 wherein the particles have an average particle size between 10 and 1000 µm.

17. The method according to claim 15 wherein the particles of the first gas diffusion layer are positioned so that a gradient exists in the size of the particles in a direction extending perpendicular to the first surface of the membrane.

* * * * *